United States Patent [19]
Voaden

[11] 3,957,939
[45] May 18, 1976

[54] METHOD FOR MANUFACTURING A COMPOSITE BEARING MEMBER

[75] Inventor: Arthur Trevor Voaden, Welwyn Garden City, England

[73] Assignee: Imperial Chemical Industries Limited, London, England

[22] Filed: Nov. 13, 1973

[21] Appl. No.: 415,426

[30] Foreign Application Priority Data
Nov. 27, 1972 United Kingdom............... 54673/72

[52] U.S. Cl................................. 264/92; 264/241; 308/238; 308/239; 425/388; 425/504
[51] Int. Cl.²...................... B29C 17/04; B29D 3/00
[58] Field of Search .................. 264/89, 90, 92, 93, 264/248, 294, 295, 320, 321, 322, 241, 237, 266; 425/387 R, 388, 503, 504; 29/149.5 R, 149.5 S; 308/238, 239, DIG. 8; 156/221, 245

[56] References Cited
UNITED STATES PATENTS

| 1,828,731 | 10/1931 | Brincil............................ 29/149.5 R |
| 2,971,248 | 2/1961 | Kingsley et al.................. 29/149.5 S |

FOREIGN PATENTS OR APPLICATIONS

| 1,178,940 | 1/1970 | United Kingdom |
| 2,151,544 | 4/1972 | Germany |

*Primary Examiner*—Jan H. Silbaugh
*Attorney, Agent, or Firm*—Cushman, Darby & Cushman

[57] ABSTRACT

A composite bearing member is made from a sheet of a thermoplastic having good impact resistance having an insert of a low friction polymeric material such as filled PTFE. The sheet with the insert therein is heated, vacuum formed and subsequently cooled such that the insert is gripped within the sheet and the sheet-insert assembly is form stable.

9 Claims, 4 Drawing Figures

U.S. Patent    May 18, 1976    3,957,939
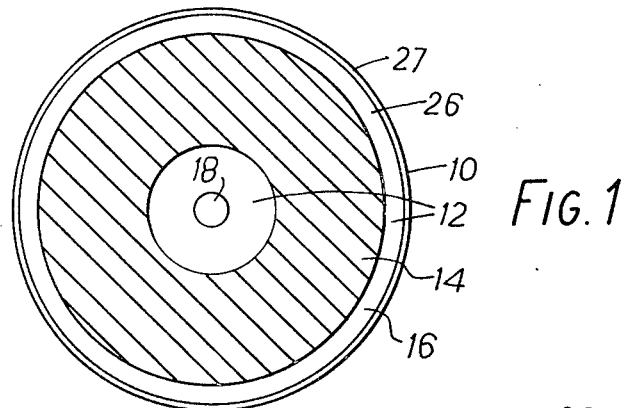
FIG. 1
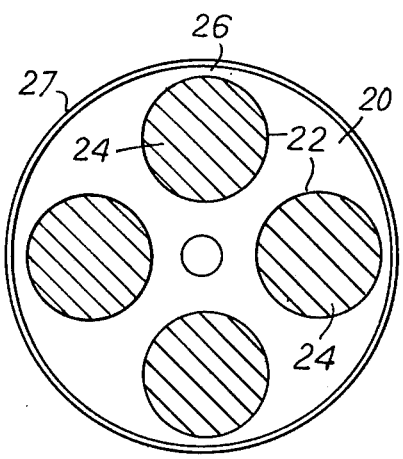
FIG. 2
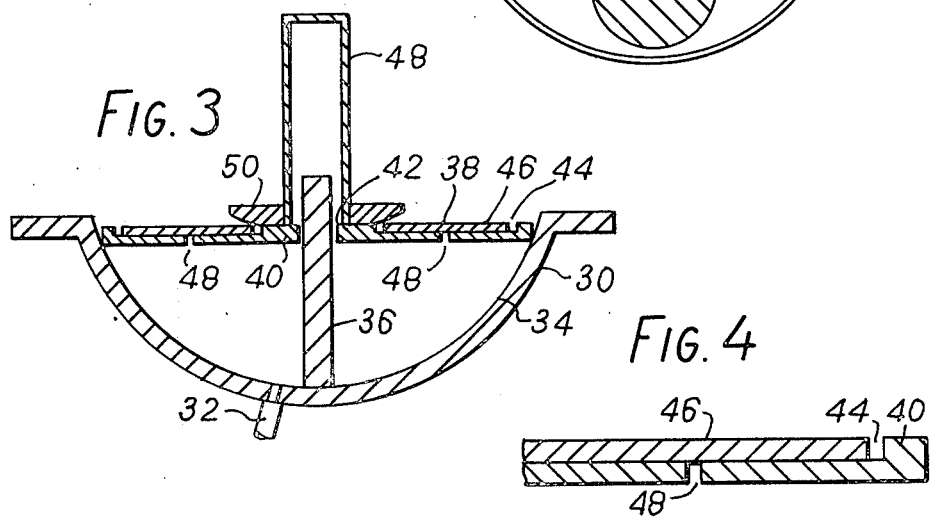
FIG. 3
FIG. 4

METHOD FOR MANUFACTURING A COMPOSITE BEARING MEMBER

This invention relates to bearing members which include polymeric materials and to methods of making such bearing members. It relates especially to curved members suitable for use as railway rolling stock bogie bearings and to a shaping process whereby suitable polymer containing materials are curved to form the bearing member.

The invention is particularly concerned with the manufacture of bearing members from a thermoplastic sheet material in which there are one or more inserts containing a low friction polymeric material such as perfluorinated alkanes and tetrafluoroethylene polymers e.g. polytetrafluoroethylene. By the term polytetrafluoroethylene, which may hereinafter be referred to as PTFE, we include tetrafluoroethylene homopolymers and copolymers of tetrafluoroethylene with a minor amount, for example up to 10% by weight of the polymer, of one or more comonomers such as ethylene or hexafluoropropene. The term "tetrafluoroethylene polymers" also includes polymers with greater than 10% of a comonomer where the polymers have suitable low friction properties, e.g. a tetrafluoroethylene: ethylene copolymer of 80:20 weight ratio may be used. The insert material may incorporate one or more fillers. Examples of fillers that may be used include glass, graphite and bronze. Filled PTFE compositions generally contain from 10 to 40% by volume of the filler.

In our copending U.K. application No. 49285/70 (West German Patent application P. 2,151,544) we describe and claim a process for the manufacture of shaped articles of PTFE wherein a sheet of PTFE, heated to a temperature at which it is shapable by fluid pressure and positioned inside a concave mould with its periphery free to move over the mould surface, is subjected to fluid pressure so as to cause the sheet to conform to the shape of the mould surface and is held in such state until it has cooled sufficiently to be form stable.

We have now discovered that this method may be modified to enable a composite bearing member to be made wherein one or more parts of a low friction polymeric material are inserted in a thermoplastic sheet and the assembly is heated and shaped by fluid pressure. By suitable choice of the thermoplastic material, it is found that bearing members can be made with adequate low friction properties and yet which have enhanced impact resistance. Increased impact resistance can be of advantage for example in the shunting direction of a railway bogie bearing. Such bearing members can, in accordance with this invention, be made in other ways.

According to this invention we provide a bearing member comprising a sheet of thermoplastic material having one or more inserts of a low friction polymeric material, the insert or inserts providing a low friction bearing surface and the thermoplastic material providing mechanical strength, especially impact resistance. By a suitable choice of thermoplastic for the base sheet, and using a higher priced low-friction polymeric material only for the insert or inserts, it is possible to manufacture a bearing member more cheaply than if the low friction polymeric material was used for the whole bearing member. The inserts themselves may contain a thermoplastic material or they may contain a thermosetting material. A preferred material for the inserts is a tetrafluoroethylene polymer e.g. PTFE, especially a filled grade of PTFE. Further examples are PTFE filled thermoplastics.

The inserts may be contacted and tightly held directly by the thermoplastic sheet, or they may be secured in whole or in part by a layer of an adhesive between the insert and the sheet. One form of bearing member is in the form of a part spherical shell, the part spherical bearing surface being either on the inside or outside of the shell. The inserts which provide the whole or a part of the bearing surface may be constituted by a part spherical shell or curved annulus contained in a recess in the inner or outer surface of the shell or one or more separate parts e.g. circular parts in these surfaces. The insert or inserts may themselves have apertures into which thermoplastic material from the base sheet extends.

The invention also provides a method for the manufacture of bearing members wherein a thermoplastic base sheet is formed with one or more recesses in one surface of a size to accept an insert or inserts of a polymeric material with low friction properties, the inserts are placed within the recesses, the assembly of the sheet and inserts is positioned inside a concave mould with the periphery of the sheet free to move over the mould surface, and the assembly is subjected to fluid pressure so as to cause it to conform to the shape of the mould surface. Prior to shaping, the base sheet and the insert or inserts are preferably heated, either separately or together, to temperatures at which they may readily be drawn by fluid pressure. After drawing, the assembly is held in the shaped condition until it has cooled sufficiently to be form stable. If the assembly is drawn cold, however, it is desirable to heat the assembly in the mould after drawing, subsequently holding it in position until it has cooled sufficiently to be substantially form stable.

When the inserts are to be on the inner surface of the bearing member, the concave mould is normally arranged so as to open upwardly, and the assembly of the thermoplastic sheet and insert or inserts, with the inserts uppermost, is drawn down into the mould. When the inserts are to be on the outer surface, the mould is normally arranged to open downwardly, and the assembly with the inserts uppermost is drawn into it upwardly.

Suitably, the thermoplastic in the sheet has a higher coefficient of expansion than the material of the inserts. Conveniently, the inserts are made to be received into the recess or recesses in the sheet with a smll clearance at the edges when they are originally placed within the recesses at ambient temperature. After the sheet has been heated, it is found that this small clearance increases at the outer edges of the insert or inserts but this gap closes as a result of the shaping procedure and subsequent cooling so that the insert or inserts are held in place, and further cooling of the assembly tightens the thermoplastic sheet around the insert to ensure that each insert is firmly held by the base sheet. If desired, in the case of an annular insert, a mechanical interlock may be provided additionally by shaping the annulus suitably e.g. with one or more flat portions or with apertures, the base sheet providing material to enter the spaces so provided and contact the edges of the insert. An adhesive may if desired be used between the base sheet and the insert or inserts. In the case where the sheet is heated prior to being drawn, the adhesive can be a thermoplastic adhesive, which will melt at the temperature to which the sheet is heated prior to draw or a thermosetting adhesive which will cure at this temperature. The adhesive in these cases is applied between the insert(s) and the base sheet prior to heating.

The adhesive can also be applied after draw, e.g. between edges of the insert or inserts and edges of recesses therefor in the base sheet, or it could be injected between the insert or inserts and the base sheet e.g. through apertures in the base sheet.

The base sheet, apart from the recesses, may be of uniform or non-uniform thickness. It is possible to use, for example, a sheet of tapering cross section (e.g. thick at the middle, tapering to thinner sections at the edges), designing the mould to ensure that the bearing surface has the desired shape, e.g. part spherical, after removal from the mould.

For the shaping step, the methods generally described in our said copending application may be used.

Bearing members in accordance with the invention may also be made by other types of moulding process. For example the insert or inserts may be suitably positioned within a mould, and the thermoplastic base sheet material may then be injection moulded around them so that once the base sheet material has set, the inserts are held firmly in position with the bearing surface exposed.

It is also possible to use the draw process of our said copending application, first positioning the inserts in the concave mould, and then drawing into the mould a thermoplastic sheet having recesses to pass over the inserts as the sheet moves into the mould.

The bearing surface of the inserts may if desired be proud of the surface of the base sheet, but this is not necessary and the suraces are usually made flush so that if desired both may be contacted by the part of the bearing which contacts the bearing member surface. In this way, the low friction properties of the insert or inserts may be used while taking full benefit from the impact resistance of the base sheet.

One form of this invention is illustrated by the accompanying drawing in which:

FIG. 1 is a plan view of a composite bearing member according to the invention having an annular insert;

FIG. 2 is a plan view of an alternative form having a number of separate inserts;

FIG. 3 is a cross-sectional view through a mould with an assembly for making a bearing member, prior to the shaping step; and FIG. 4 is a scrap cross-sectional view of part of FIG. 3 on a larger scale.

In FIG. 1, a bearing member 10 is in the form of a part spherical shell. It consists of base sheet 12 of a thermoplastic material having a curved annular insert 14 composed of filled PTFE shown with shading for clarity. The bearing surface is on the inside 16 of the shell and is provided by both the insert and the base sheet which after the forming operation give a continuous part spherical bearing surface suitable for contacting e.g. by a smooth metal bearing member. A central aperture in the base sheet will be observed at 18.

In FIG. 2 the base sheet 20 has four separate circular recesses 22 in which circular filled PTFE inserts 24 shown shaded are tightly held mechanically or by adhesion. This form of bearing member may be used for similar applications to those of the bearing member of FIG. 1, provided the pressure limit on the inserts is not exceeded as a result of the insert area being reduced.

It will be seen that in each of the FIG. 1 and FIG. 2 embodiments, there is an area 26 of thermoplastic material between the outer edge 27 of the bearing member and the insert material 14, 24. This provides mechanical strength by preventing the inserts from being pushed outwardly from the assembly during use and it also provides a surface which itself may be contacted by the bearing part for example if this is jolted during use, the thermoplastic material being chosen to have sufficient mechanical strength, especially impact resistance, to tolerate this type of use and give a longer life than if the whole assembly were made of filled PTFE.

The inserts are preferably formed of sintered discs of filled PTFE. They could also be formed of a PTFE filled thermoplastic. Mouldings of unsintered filled coagulated dispersion grade of PTFE could also be used. The thermoplastic base sheet in each of the above embodiments may comprise polypropylene, propylene ethylene copolymers, high density and low density polyethylene, polyvinyl chloride, polyurethanes, polyacetals, 4-methyl pentene-1, polysulphones, ABS resins and nylon. PTFE filled thermoplastic materials may also be used. The blank with one or more recesses to receive the inserts may be made by injection moulding, coining, or machining of an extruded sheet.

Suitable materials for making the inserts are bronze and graphite filled PTFE e.g. as sold by Imperial Chemical Industries under the Trade Mark 'Fluon' VB60 and VR15. Glass filled PTFE may also be used e.g. as sold by Imperial Chemical Industries Limited under the Trade Mark 'Fluon' VG15 and VG25.

The frictional properties of the form of bearing members shown in FIG. 1 may be modified by having exposed areas of the base sheet 12 in apertures of the annular insert 14.

Referring to FIGS. 3 and 4, a method is shown for making a bearing member of the type illustrated in FIG. 1. A mould 30 made of metal or any other suitable material is provided at its base with a port 32 for the application of vacuum. The mould has a moulding surface 34 which is substantially part spherical. The moulding surface presents a slightly deeper cavity than that of a true part spherical surface to allow for a small degree of relaxation of the bearing member after it has cooled and is released from the mould. The moulding surface is so proportioned that on relaxation of the bearing member its bearing surface adopts a true part spherical shape. It is provided with a central cylindrical upstanding axial core 36 to act as guide means for the sheet as it is drawn down by vacuum into the mould.

At 38, there is shown, prior to the shaping step, an assembly which has been loaded into the mould.

The assembly consists of a circular sheet 40 of a suitable thermoplastic material e.g. polypropylene having a central aperture 42 of a size to pass around the core 36 and slide down it as the sheet is drawn, whereby the sheet is maintained coaxial with the mould. The sheet 40 has an annular recess 44 of a suitable shape and size to receive in the cold condition an annular or disc shaped insert 46 of a sintered filled PTFE, a small clearance being left between the outer edge of the insert 46 and the outer edge of the recess 44. In an alternative form, the recess 44 is circular having an outer edge as shown but continuing across the centre of the sheet 40.

Before the assembly is loaded into the mould, it is heated in an oven until the thermoplastic material is sufficiently soft to be formable. In the case of polypropylene, the assembly is heated until the polypropylene is not completely molten but is in a rubbery condition, a suitable temperature being around 160°C. It is found that as the assembly is heated, the width of the gap between the outer periphery of the insert 46 and the outer edge of the recess 44 increases because of the greater expansion of the polypropylene. This is shown in FIG. 4.

The assembly is loaded into the mould as shown in FIG. 3 with the aperture 42 over the core 36 and the insert 46 uppermost. A tubular member 48 having one open end and one closed end is placed over the upper end of the core 36 with its open end in contact with the upper surface of the sheet 40 and light pressure is applied until a seal is made with this surface on application of vacuum at 32 whereby fluid (air) pressure is applied to the other surface of the assembly. A shaped foot 50 on the tubular member 48 helps the shaping of the sheet and build up of vacuum beneath the sheet. It also assists in holding the inner periphery of the insert within the recess 44 as the assembly is formed. The fluid pressure shapes the sheet inwardly, the tubular member 48 passing down with the sheet so that the seal is maintained, the edges of the sheet sliding downwardly over the surface of the mould cavity, and the aperture 42 sliding down the core 36. When the sheet has been drawn fully into the mould, vacuum is held and the sheet allowed to cool until it is substantially form stable i.e. stable except for the small degree of relaxation previously mentioned. It can then be removed from the mould.

To ensure that the insert 46 remains firmly in place during the shaping operation, small communicating holes 48 may be provided between the base of the recess 44 and the base of the sheet, whereby vacuum is applied also to the insert in the recess 44.

In an alternative method, the tubular member 48 may be replaced by a sliding seal, e.g. in the form of an apertured rubber sheet secured to the upper surface of the shaped foot 50 the aperture making a sliding seal against the core 36. The foot 50 may if desired be made larger than shown in FIG. 3.

Where the insert or inserts are to be included on the outside of the assembly (the assembly being drawn upwardly into the mould) communicating holes may be made in the inserts to provide a pressure between the insert(s) and the sheet which is equal to that between the assembly and the mould.

It is found that as a result of the shaping operation of FIG. 3 and subsequent partial cooling, the gap between the outer periphery of the insert and the outer edge of the recess is closed. On further cooling of the sheet prior to release from the mould, the thermoplastic sheet material contracts and this forms and even tighter grip between the sheet and the insert.

After cooling and unloading, the bearing member is submitted to appropriate finishing operations.

The invention is of particular utility in making hemispherical bearing pads suitable for use in bogie bearings, for example on railway locomotive waggon and carriage bogies. The base sheet may if desired be formed with an outwardly directed flange at the top of the outer edge as a further protection for the female and male members of the bogie bearing assembly.

Though it will be usual to heat the thermoplastic sheet, prior to drawing, in making the bearing members, sheets may be used which are sufficiently thin to be drawn into shape while at ambient temperatures. Preferably they are drawn into a heated mould and subsequently allowed to cool, or they may be drawn into a cold mould, the mould subsequently being heated and allowed to cool.

I claim:

1. A method for the manufacture of a bearing member comprising forming a thermoplastic base sheet with a recess in the surface inwardly of the outer periphery of the sheet and substantially concentric with the sheet, heating the base sheet to a temperature at which the thermoplastic is readily deformable by fluid pressure, placing an insert formed from a sheet of a material selected from the group consisting of tetrafluoroethylene homopolymers and filled tetrafluoroethylene homopolymers in the recess before, after, or during the heating step, the insert, prior to the heating step, fitting within the recess with a small gap left between the outer edge of the insert and the adjacent edge of the recess, positioning the assembly of the base sheet and the insert in a concave mould with the periphery of the base sheet free to move over the mould surface, subjecting the assembly of the base sheet and the insert to fluid pressure to cause it to conform to the shape of the mould surface and allowing it to cool in this position, whereby the shaping and cooling contraction cause the gap to close so that the insert becomes firmly gripped at its outer periphery by the edge of the recess and the assembly as a whole becomes form stable.

2. A method according to claim 1 wherein the recess is circular in shape and the insert is circular or annular in shape.

3. A method according to claim 1 wherein the recess and the insert are both annular in shape.

4. A method according to claim 1 wherein at least one aperture is formed in the recess area of the base sheet so that the pressure on the underside of the insert is equalized with the pressure on the underside of the base sheet as it is moulded.

5. A method according to claim 1 wherein the base sheet is circular and is drawn into a substantially part-spherical mould.

6. A method according to claim 5 wherein the mould has an upstanding axial core member which passes through a central aperture in the base sheet and acts as guiding means as the assembly is moulded.

7. A method according to claim 6 wherein a closed tubular member with a shaped foot at its open end is placed on top of the assembly of the base sheet and insert and over the top of the core member as the assembly is formed to assist the shaping of the assembly and to assist the build up of a vacuum which is applied between the mould and the sheet.

8. A method according to claim 1 wherein the thermoplastic material of the base sheet is selected from the group consisting of polypropylene, propylene ethylene copolymers, high density and low density polyethylene, polyvinylchloride, polyurethanes, polyacetals, 4-methylpentene-1 polymers, polysulphones, ABS resins and polyamides.

9. A method according to claim 1 wherein the base sheet is made of polypropylene and is heated to a temperature of approximately 160°C prior to forming.

* * * * *